United States Patent Office 2,839,415
Patented June 17, 1958

2,839,415

CERAMIC PRODUCTS

Archibald R. Gmeiner, Waupaca, Wis., assignor to Kimberly-Clark Corporation, Neenah, Wis., a corporation of Delaware No Drawing. Application September 13, 1955
Serial No. 534,167

4 Claims. (Cl. 106—71)

The present invention relates generally to the making of ceramics and is particularly concerned with an improved method for making structural clay products.

In the manufacture of structural clay products, such as bricks, tiles, pipes and the like, which are also called "heavy clay products" in the ceramics industry, there is a real problem involved in the amount of loss encountered through cracking, chipping etc. during the making and handling of the product. This loss is important from the standpoint of being able to produce a structural clay product on a competitive basis with similar products made of other materials. Consequently, there is considerable interest in reducing the percentage of clay products lost during manufacture. Of course, it is also quite important to provide a product of adequate strength for its intended purpose.

Many different methods have been proposed and used in the making of bricks and the like, with varying degrees of success, in an effort to reduce the losses during handling and improve the quality of the clay product. Generally, this development has involved experimentation with various binder materials in an effort to achieve a tougher piece in the green state as well as more strength for the fired product.

The present invention has for its principal object the provision of an improved method for making structural clay products, in a manner which improves their strength both in the unfired and fired state and, therefore, reduces the loss in manufacturing and handling.

Although certain principles of this invention may have utility elsewhere, the invention is particularly adapted to structural clay products and will be described with respect thereto. Generally, these are a burned clay product which may include shale as well as clay. The structural clay products are usually considered to be building bricks (smooth, textured and common), building tile (hollow structural tile, drain tile etc.), glazed structural clay bricks, sewer pipes, barn tiles etc., and in general those clay products wherein the load-bearing strength of the product is an essential factor. Further, structural clay products are considered to be those ceramic products which are made from natural deposits and which are fused together under intense heat.

For some time organic binders have been offered as a possible solution to the structural clay products manufacturers' problem of breakage and strength, and rather extensive testing has been conducted with various binder materials. Some of the possible binders are, of course, too costly to be practical, particularly for structural clay products which must have a relatively low unit cost to be competitive. Other of the binders are not sufficiently general in their benefits, with respect to the various types of clay found in different geographical areas and, therefore, are limited in their application.

The present invention provides a novel and improved process for the manufacture of clay products, which involves the addition of waste sulfite liquor, which has been previously concentrated, to the natural clay and/or shale body. This liquor results from the treatment of wood in making pulp by the sulfite process, wherein the cellulose fibers are liberated from the wood by the employment of an aqueous solution of sulfurous acid in which a calcium, magnesium or ammonia base has been dissolved. During the process, lignin and a proportion of the carbohydrates in the wood are separated from the cellulose fibers in the wood. This treatment of the wood is carried on in a tall cylindrical vessel, called a digester, where steam is used to heat the digester charge.

After the wood has been cooked in the digester, the contents of the digester are usually discharged under a pressure of about 50 lbs. or less into a blow pit. The blow pit normally consists of a tank with a false bottom through which the waste liquor may drain. Water is added to the blow pit in order to further wash the pulp. Before adding the wash water, the liquor generally contains from 10 to 20 percent of solids, and the present invention contemplates the use of this liquor in concentrated form before it is further diluted by the wash water.

The waste sulfite liquor thus obtained contains the soluble products of digestion, which amount to 50 percent or more of the original wood substance. Although the exact composition of the waste liquor is not completely known, it is believed to include lignin, carbohydrates, proteins, resin, fat, sulfur dioxide combined with lignin, and the calcium salt of lignosulfonic acid (or the magnesium or ammonia salt, if either of the latter are used as a base for the sulfurous acid used in the digester). In this latter respect it has been found undesirable to use a sodium salt as a base for the liquor used in this invention, since it results in a lowering of the fusing point of the clay product and, also, produces a condition of efflorescence in the product.

In the present method the waste sulfite liquor is concentrated after it is taken from the blow pit, as by evaporation under heat, to drive off any free gases, such as sulfur dioxide, and to provide from about 25 to 65 percent solids. This concentrated liquor is then used very advantageously in the making of structural clay products.

In the making of burned clay products for structural purposes, the clay is comminuted into small particles. It should be understood that the term "clay" as used herein refers to those natural deposits from which bricks and other structural clay products are made, and such deposits include shale which is a natural consolidation of clay, mud or silt into a stratified rock formation.

The comminuted clay particles are delivered to a pug mill where they are mixed with water in the proportions usually followed in the industry, generally in an amount sufficient to provide a moisture content of from 10 to 20 percent, by weight of the moistened clay. The introduction of clay and the tempering water to the pug mill is generally a simultaneous and continuous operation, with the clay being moved through the mill at a rate affording a uniformly moist plastic mix as it reaches the outlet end of the pug mill. The necessary mixing time will, of course, vary with the moisture content of the clay particles, but generally is between 5 and 15 minutes. Usually, there is associated with the pug mill and/or the extruder some means for removing the air from the clay mix, and this may be in the form of a closed housing having a vacuum source communicating with the interior of the housing. In the extruder the mix is formed into a bar of clay conforming in cross-section to two of the dimensions of the desired size of brick. The extruded clay bar is then cut transversely at suitable intervals to provide the final form of the individual bricks and is delivered to the drying ovens.

Several different procedures are used in the industry with respect to the drying and firing of clay products such as bricks, but generally they all follow a pattern of drying and preheating, firing, and cooling of the fired brick. In one system, the bricks are dried by gradually increasing the heat in the drying oven over a period of 24 to 72 hours until the bricks are thoroughly dried of free moisture. The bricks are then further dried and burned in a kiln for about 4 to 7 days and nights at temperatures beginning at about 212° F. and increasing up to about 1800 to 2150° F. The bricks are then preferably cooled at a controlled rate to avoid setting up any excessive stresses in the bricks. Other types of heat treatment are employed but the present invention is not restricted to any particular procedure for drying and firing the bricks and, therefore, a single illustrative process should be sufficient for purposes of this disclosure.

In the initial mixing of the clay it is important that a uniform distribution of moisture be achieved and that the clay be mixed to a consistency particularly adaptable for handling by the extruder, and preferably of low moisture content to avoid shrinkage, warping etc. during the drying operation. One of the problems which is related to the type of clay mix achieved in the pug mill is that of having the clay stick to the sides of the extruder as the green clay product is formed.

The drying of the bricks prior to the burning or firing step is very critical in nature, in that it is important not to completely dry the outside of the brick before the center or core is dry. Otherwise there will occur a crusting around the outside, and this crust or shell is quite susceptible to cracking during drying and chipping and breaking during subsequent handling. Furthermore, with the described crusting there will usually be considerable moisture locked within the brick to cause deformation of the brick during subsequent heating.

Then too, the successful firing of the brick, wherein the clay particles are fused together and the organic materials, if any, are burned off, is dependent to a considerable extent on the previous handling of the clay. The uniformity of the clay mix, the strength of the green piece, and the density thereof are important factors in determining the results achieved in the firing step and in the subsequent cooling of the fired bricks.

It is seen from the foregoing that the various stages of handling clay products, such as bricks, are all quite critical and seriously affect the amount of loss encountered in manufacturing such products.

According to the present invention, considerable advantage is gained with respect to the handling of clay, in improving the quality of the burned clay products, and in reducing the loss encountered in their manufacture by adding previously concentrated waste sulfite liquor solids to the clay particles in the pug mill in the amount of from 0.1 to 1.0 percent solids, based on the weight of the finished product. The sulfiite liquor is concentrated with respect to the form generally taken from the blow pit to provide a solids content within the range of from about 25 to 65 percent. The preferred concentration of the sulfite liquor is about 50% solids, and the preferred amount of such liquor solids added to the clay is about 0.3 percent solids of the weight of the finished clay product. In the preferred method of this invention, the amount of tempering water used and the other steps followed in the making of fired clay products are in accordance with present practices in the industry as described herein. The use of a sulfite liquor which has been previously concentrated offers very definite advantages in the results achieved with the present invention, particularly because the concentrated liquor does not contain any free gases, such as sulfur dioxide, which would be harmful in the production of structural clay products. Although it is not definitely known, it is believed that the concentration of the liquor solids also provides other advantageous changes in the waste sulfite liquor.

The sulfite liquor is added directly to the clay particles in the pug mill, preferably alone but it may be added with the tempering water. In the latter respect, the sulfite liquor may also be diluted with tempering water prior to its addition to the clay in the pug mill. For example, the concentrated waste sulfite liquor might be diluted with water to about 10 to 25 percent solids and then added to the clay in the pug mill in fixed amounts, depending upon the process and product requirements, to give the desired amount of residual sulfite liquor solids in the brick or other structural clay product. Additional water could then be added as required to control the moisture content within the desired range.

The addition of the sulfite liquor lends plasticity to the wet clay product, and also serves as a dispersing agent which provides more uniform dispersal of the moisture through the clay. This can lead to higher densities of the clay with the use of less water. These factors all contribute appreciably to the improved forming of the wet clay product as a stronger unit and without damage thereto. Further, the sulfite liquor provides a lubricant for the clay which is particularly advantageous in extrusion of the wet clay product. Consequently, the wet clay is more easily handled without damage, which is particularly important with respect to extruded products such as bricks, hollow tiles etc.

Furthermore, the sulfite liquor added to the clay improves the drying and firing of the product. Since the liquor serves to disperse the moisture uniformly through the wet product and to densify such product in a uniform manner, it is easier to achieve a uniform and thorough drying and firing of such products. Consequently, there is avoided any crusting of the product or the entrapment of water within the product, which will otherwise prevent proper drying and cause the product to fracture or to chip during further handling.

Then too, in the form indicated above, the sulfite liquor contains all of the original solid materials present in the blow pit, and these materials contribute much in making improved clay products. The uniformly dispersed carbonaceous materials in the liquor are burned off during the firing of the clay products and leave many small voids throughout the product, to thereby provide a uniform, multi-cellular fused structure which is particularly resistant to fracturing and chipping.

It will also be noted that the foregoing advantages are realized with the addition of a very small quantity of sulfite liquor solids, 1 percent or less. This is largely due to the fact that all of the resins, carbohydrates etc. are present in high concentration and have not been partially eliminated or lost entirely, or converted to a less effective form, as is encountered by re-processing the waste liquor to reduce it to powdered form or the like. Consequently, the full binding and strengthening effect of the liquor is utilized.

Then too, it should be realized that the method disclosed herein is very economical in that it utilizes an additive material for the clay which is inexpensive and obtainable in large quantities throughout the country. The paper industry is very much concerned with the problem of waste sulfite liquor disposal and the use of this liquor by the ceramics industry is an aid to the solution of their problem.

Although described with respect to particular processes for making structural clay products, it will be apparent to those skilled in the art that the principles of this invention are also useful in other processes by which structural clay products are made or can be made.

I claim:

1. A method of making structural clay products comprising the steps of mixing comminuted clay particles in a pug mill with waste sulfite liquor and tempering water, said waste sulfite liquor being present in the pug mill in an amount of from about 0.1 to 1.0 percent solids by weight of the finished clay product, said waste sulfite liquor being selected from the class consisting of calcium, magnesium and ammonium base liquors and having been concentrated prior to introduction into the pub mill to provide a solids content for the liquor of from about 25 to 65 percent, said clay, tempering water and waste sulfite liquor being mixed together in the pub mill over a period of time sufficient to achieve uniform dispersal of the constituents of the mix, forming said mix under pressure, and drying and firing the shaped clay products.

2. A method of making structural clay products comprising the steps of mixing comminuted clay particles in a pug mill with tempering water and with waste sulfite liquor, said waste sulfite liquor being present in the pug mill in an amount of from about 0.1 to 1.0 percent solids by weight of the finished product, said waste sulfite liquor being selected from the class consisting of calcium, magnesium and ammonium base liquors and having been evaporated prior to introduction into the pug mill to provide a concentrated liquor having a solids content of from about 25 to 65 percent, said clay, tempering water and waste sulfite liquor being mixed together in the pug mill over a period of time sufficient to achieve uniform dispersal of the constituents of the mix, said waste sulfite liquor in the pug mill serving as a plasticizer and as a dispersing agent to provide uniform dispersal of the moisture throughout the clay, forming said mix under pressure wherein said waste sulfite liquor provides a lubricant for the clay and facilitates its formation into a predetermined shape, and drying and firing the shaped clay products under conditions wherein the carbonaceous materials in the waste sulfite liquor are burned off to leave many small voids throughout the product to thereby provide a uniform multi-cellular structure which is particularly resistant to fracturing and chipping.

3. A method of making structural clay products comprising the steps of mixing comminuted clay particles in a pug mill with tempering water and with waste sulfite liquor, said waste sulfite liquor being added to the clay in the pug mill in an amount of from about 0.1 to 1.0 percent solids by weight of the finished product, said tempering water being added to the clay in the pug mill in an amount of from 10 to 20 percent by weight of the moistened clay, said waste sulfite liquor being selected from the class consisting of calcium, magnesium and ammonium base liquors and having been evaporated prior to introduction into the pug mill to provide a solids content for the liquor of from about 25 to 65 percent, said clay, tempering water and waste sulfite liquor being mixed together for a period of from about 5 to 15 minutes to achieve uniform dispersal of the constituents of the mix, said waste sulfite liquor serving as a plasticizer and as a dispersing agent to provide uniform dispersal of the moisture throughout the clay, forming said mix under pressure wherein said waste sulfite liquor provides a lubricant for the clay and facilitates its formation into a predetermined shape, and drying and firing the shaped clay products at temperatures increasing upwardly to about 1800° F. to 2150° F., whereby the carbonaceous materials in the waste sulfite liquor are burned off to leave many small voids throughout the product to thereby provide a uniform multi-cellular structure which is particularly resistant to fracturing and chipping.

4. A method of conditioning natural clay for the making of fired, structural clay products, comprising the steps of mixing comminuted clay particles in a pug mill with tempering water and with waste sulfite liquor, said waste sulfite liquor being added in the pug mill in an amount of from about 0.1 to 1.0 percent solids by weight of the finished clay product, said waste sulfite liquor being selected from the class consisting of calcium, magnesium and ammonium base liquors and having been concentrated prior to introduction into the pug mill to provide a solids content for the liquor of from about 25 to 65 percent, said clay, water and concentrated waste sulfite liquor being mixed together in the pug mill over a period of time sufficient to achieve uniform dispersal of the constituents of the mix.

References Cited in the file of this patent

UNITED STATES PATENTS

| 1,390,435 | Gerlach et al. | Sept. 13, 1921 |
| 1,394,241 | Weber | Oct. 18, 1921 |

FOREIGN PATENTS

| 361,858 | Great Britain | 1931 |